US00RE40350E

(19) United States
(12) Reissued Patent
Kotchi et al.

(10) Patent Number: US RE40,350 E
(45) Date of Reissued Patent: Jun. 3, 2008

(54) FAIL SAFE THROTTLE POSITIONING SYSTEM

(75) Inventors: Gary W. Kotchi, Shelby Township, MI (US); Michael J. Halsig, Warren, MI (US)

(73) Assignee: BorgWarner Inc., Auburn Hills, MI (US)

(21) Appl. No.: 11/237,580

(22) Filed: Sep. 28, 2005

Related U.S. Patent Documents

Reissue of:
(64) Patent No.: 5,429,090
Issued: Jul. 4, 1995
Appl. No.: 08/203,274
Filed: Feb. 28, 1994

(51) Int. Cl.
*F02D 11/10* (2006.01)
*F02D 41/22* (2006.01)

(52) U.S. Cl. ..... 123/396; 123/399; 123/403
(58) Field of Classification Search ..... 123/339.13, 123/339.15, 361, 396–400, 403; 251/304, 251/305
See application file for complete search history.

(56) References Cited

U.S. PATENT DOCUMENTS

| | | | | | |
|---|---|---|---|---|---|
| 4,601,271 | A | | 7/1986 | Ejiri et al. | |
| 4,785,782 | A | | 11/1988 | Tanaka et al. | |
| 4,831,985 | A | | 5/1989 | Mabee et al. | |
| 4,850,319 | A | | 7/1989 | Imoehl | |
| 4,867,122 | A | | 9/1989 | Kono et al. | |
| 4,879,657 | A | * | 11/1989 | Tamura et al. | 123/399 |
| 4,892,071 | A | * | 1/1990 | Asayama | 123/396 |
| 4,909,213 | A | | 3/1990 | Mezger et al. | |
| 4,940,031 | A | | 7/1990 | Mann | |
| 4,947,815 | A | | 8/1990 | Peter | |
| 4,951,772 | A | | 8/1990 | Peter et al. | |
| 4,953,529 | A | | 9/1990 | Pfalzgraf et al. | |
| 5,014,666 | A | * | 5/1991 | Westenberger | 123/339.15 |
| 5,078,110 | A | * | 1/1992 | Rodefeld | 123/399 |
| 5,092,296 | A | | 3/1992 | Gunter et al. | |
| 5,103,787 | A | | 4/1992 | Bassler et al. | |
| 5,121,727 | A | | 6/1992 | Kramer et al. | |
| 5,233,530 | A | * | 8/1993 | Shimada et al. | 123/399 |
| 5,235,951 | A | * | 8/1993 | Taguchi et al. | 123/397 |
| 5,263,448 | A | * | 11/1993 | Bluhm et al. | 123/396 |
| 5,297,521 | A | | 3/1994 | Sasaki et al. | |
| 5,325,832 | A | * | 7/1994 | Maute et al. | 123/396 |

FOREIGN PATENT DOCUMENTS

| | | | | |
|---|---|---|---|---|
| DE | 3718544 | | 12/1988 | |
| DE | 4115647 | | 11/1992 | |
| DE | 4126025 | | 2/1993 | |
| EP | 0154036 | | 9/1985 | |
| JP | 60230520 | | 11/1985 | |
| JP | 3237227 | | 10/1991 | |
| JP | 04060143 A | * | 2/1992 | 123/396 |
| JP | 6229263 | | 8/1994 | |

* cited by examiner

*Primary Examiner*—Willis R. Wolfe, Jr.
(74) *Attorney, Agent, or Firm*—Warn Partners, P.C.

(57) ABSTRACT

A fail-safe throttle positioning device is disclosed for an engine induction system. A throttle body is provided having a fluid passage. A movable throttle valve is disposed within the fluid passage for at least idle speed control. An actuator mechanism is connected to the throttle valve for operably moving the throttle valve between a minimum fluid flow position and a maximum fluid flow position. A fail-safe mechanism urges the throttle valve toward an intermediate position between the minimum and maximum fluid flow positions to prevent inoperability of the engine during failure of the actuator mechanism.

25 Claims, 3 Drawing Sheets

FAIL SAFE THROTTLE POSITIONING SYSTEM

Matter enclosed in heavy brackets [ ] appears in the original patent but forms no part of this reissue specification; matter printed in italics indicates the additions made by reissue.

FIELD OF THE INVENTION

The present invention relates to an air metering throttle body assembly for an internal combustion engine, and more particularly, to a throttle positioning device to prevent inoperability of the engine during failure of the throttle actuator.

BACKGROUND OF THE INVENTION

A typical throttle body assembly in present-day use takes the form of a one-piece metal casting formed with a main bore or flow passage extending through the body along a first axis which is intersected by a throttle shaft bore extending through the body along a second axis perpendicular and intersecting the axis of the main bore. A circular throttle plate is mounted within the main bore on a shaft rotatably supported in the shaft bore. By rotating the shaft, the plate can be moved between a blocking or minimum flow position, in which the plate is generally perpendicular to the axis of the main bore, to a maximum open position in which the plate is aligned with the bore axis to thereby meter flow through the main bore.

Throttle control valve systems have recently been developed which override the driver's command as represented by his positioning of the accelerator pedal by taking over control of the throttle. These systems are frequently referred to as "electronic throttle control" or "drive-by wire" systems in that there is no direct mechanical connection between the accelerator pedal and the throttle, the pedal position being transmitted to an electronic control unit as an electric signal which is processed by the control unit and transmitted by the control unit in the form of an electric signal to an electromechanical throttle actuator. This type of "drive-by wire" system may also be adapted for sensing the speed of the engine driven wheels with respect to that of the non-driven wheels, so that if the speed of the driven wheels becomes greater than that of the non-driven wheels, the control unit can transmit an electric signal to the electromechanical actuator which alters the position of the throttle plate to reduce the torque output of the engine until the engine driven wheels regain traction.

While such "drive-by wire" systems, in general, are quite reliable, a malfunction of the electrical supply system or the electronic control unit can result in a total loss of control by the driver over the throttle valve position in that the sole control over the position of the throttle valve is an electrical signal from the electronic control unit, and there is no direct mechanical connection between the accelerator pedal and the throttle valve. In the worst case, an electrical or electronic malfunction could result in unintended and uncontrollable acceleration of the vehicle, should the throttle plate, upon the loss of its electrical positioning signal, be in or moved to a wide open position. Consequently, most throttle plates are spring-biased to move to a closed position in response to loss of an electrical control signal, rendering the vehicle more or less effectively immobilized in that the idle air flow will be reduced to a minimum.

SUMMARY OF THE INVENTION

The present invention is directed to providing a fail-safe throttle positioning system to prevent inoperability of the engine during failure of the throttle actuator and to maintain the ability to continue to drive at a limited, but reasonable speed in the event of such malfunction by placing the throttle valve in a "limp home" mode where the throttle valve is positioned intermediate between the minimum and maximum flow positions. The actuator mechanism can include a throttle level connected for rotation to a shaft supporting the throttle valve. The throttle lever may include a first surface engageable with a first stop defining a minimum fluid flow position and a second surface engageable with a second stop defining a maximum fluid flow position. Throttle spring means urges the throttle lever toward the normal minimum fluid flow position. The fail-safe mechanism may include a fail-safe lever rotatably mounted on the shaft supporting the throttle valve. The fail-safe lever may include a first surface engageable with the throttle lever and a second surface engageable with a fail-safe stop. Fail-safe spring means urges the fail-safe lever toward the fail-safe stop so that the throttle lever is held in the intermediate position until driven by the actuator mechanism toward one of the minimum and maximum fluid flow positions. The actuator means may also include a mechanically operated actuator means connected to the throttle lever at one end and to the driver actuated accelerator mechanism, such as a pedal, at the other end to be responsive to driver input. The mechanically operated actuator means may include a cable connected between the throttle lever and the accelerator mechanism actuated by the driver. In the alternative, the actuator means may include an electrically operated actuator means connected to the throttle lever at one end and connected to the accelerator mechanism at the other end to receive driver input. The electrically operated actuator means may include what is typically referred to as "electronic throttle control" or "drive-by wire" configuration.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
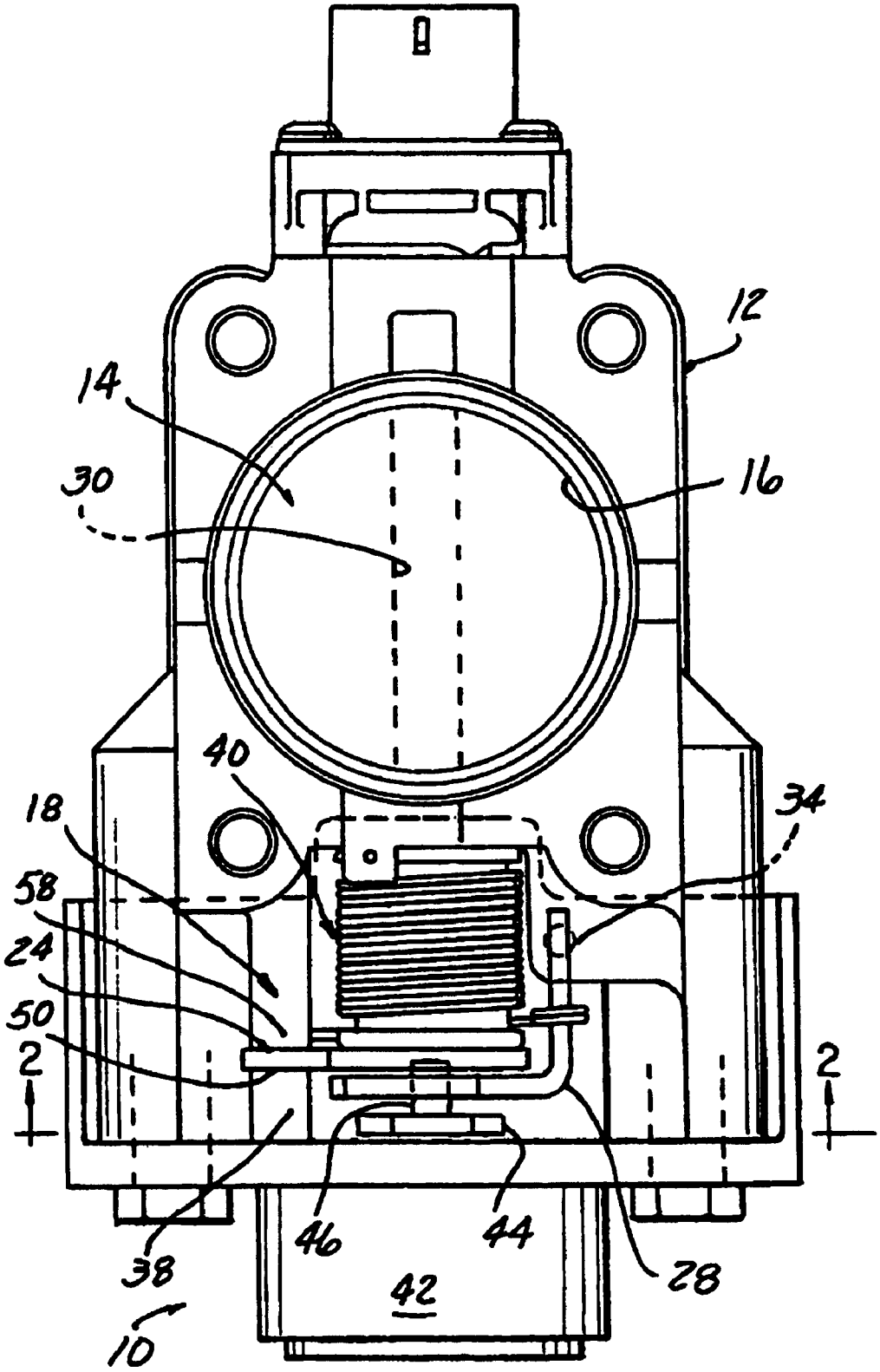
FIG. 1 is a plan view of a full-safe throttle position device for an engine induction system mounted on a throttle body according to the present invention.

The fail-safe throttle positioning system 10 can be part of a conventional mechanically operated engine induction throttling device, such as a throttle body 12, with a direct acting idle speed control, such as a movable throttle valve 14, for use with a spark ignition engine. The fail-safe throttle positioning system 10 of the present invention can also be incorporated into an electric operated engine induction system throttling device that provides complete drive-by wire functions of idle speed control, traction control, transmission shift harshness control, vehicle speed control and deceleration air control on a spark ignition engine. In its simplest form, the fail-safe throttle positioning device 10 according to the present invention includes the throttle body 12 with a movable throttle valve 14 for at least idle speed control mounted for movement with respect to the throttle body 12. The movable throttle valve 14 is disposed in a fluid passage 16 formed in the throttle body 12 for controlling fluid flow through the fluid passage 16 in response to movement of the throttle valve 14. Actuator means 18 is connected to the throttle valve 14 for operably moving the throttle valve 14 between a minimum fluid flow position 20 and a maximum fluid flow position 22. Fail-safe means 24 urges the throttle valve 14 toward an intermediate fluid flow position 26 between the minimum and maximum fluid flow positions, 20 and 22 respectively, to prevent inoperability of the engine during failure of the actuator means 18.

The actuator means 18 may include a throttle lever 28 connected to a shaft 30 supporting the throttle valve 14 within the fluid passage 16 of the throttle body 12. The throttle lever 28, shaft 30 and throttle valve 14 moving in rotation with one another. The throttle lever 28 includes a first surface 32 engageable with a first stop 34 defining the minimum fluid flow position 20. A second surface 36 of the throttle lever 28 engages with a second stop 38 defining the maximum fluid flow position 22. Throttle spring means 40 normally urges the throttle lever 28 toward the minimum fluid flow position 20. The actuator means 18 may also include a mechanically operated actuator means connected to the throttle lever 28 and responsive to driver input, or alternatively may include an electrically operated actuator means connected to the throttle lever 28 and responsive to driver input. The electrically operated actuator means may include a "drive-by wire" configuration where the throttle lever 28 is operably actuated by a reversible electric motor 42 having a radially extending drive arm 44 supporting a drive pin 46 drivingly engaged within an elongated slot 48 formed in the throttle lever 28. The radially extending drive arm 44 and connected drive pin 46 are driven in rotation about the shaft of the reversible electric motor 42 in response to electric signals for driving the reversible electric motor in the desired direction to position the movable throttle valve 14 in the desired fluid flow position.

The fail-safe means 24 may include a fail-safe lever 50 rotatably mounted with respect to the shaft 30 so that the fail-safe lever 50 can rotate independently of the shaft 30. The fail-safe lever 50 includes a first surface 52 engageable with the throttle lever 28, such as with longitudinally extending throttle tab 54. A second surface 56 of the fail-safe lever 50 engages with a fail-safe stop 58. Fail-safe spring means 60 urges the fail-safe lever 50 toward the fail-safe stop 58 so that the throttle lever 28 is driven through contact between the fail-safe lever 50 and the longitudinally extending throttle tab 54 formed on the throttle lever 28 until it reaches the intermediate fluid flow position 26 corresponding to the fail-safe lever 50 engaging the fail-safe stop 58. The throttle lever 28 is held in the intermediate position 26 until driven by the actuator means 18 toward one of the minimum and maximum fluid flow positions, 20 and 22 respectively.

Figure 2:
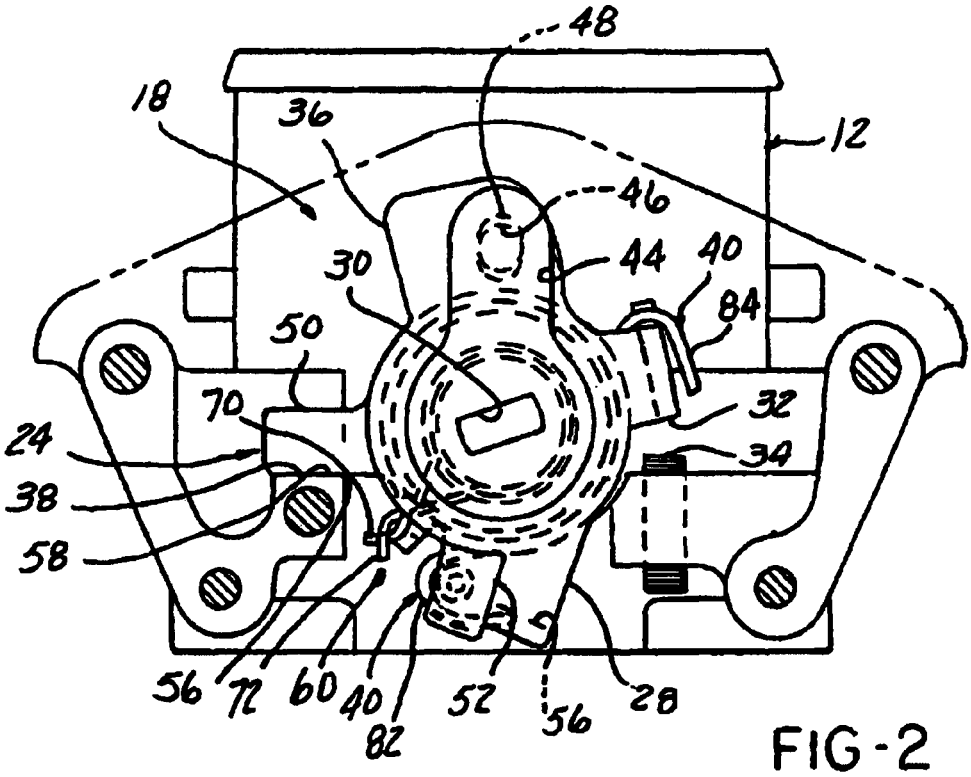
FIG. 2 is a side elevational view of the fail-safe throttle positioning device as illustrated in FIG. 1.
Figure 3:
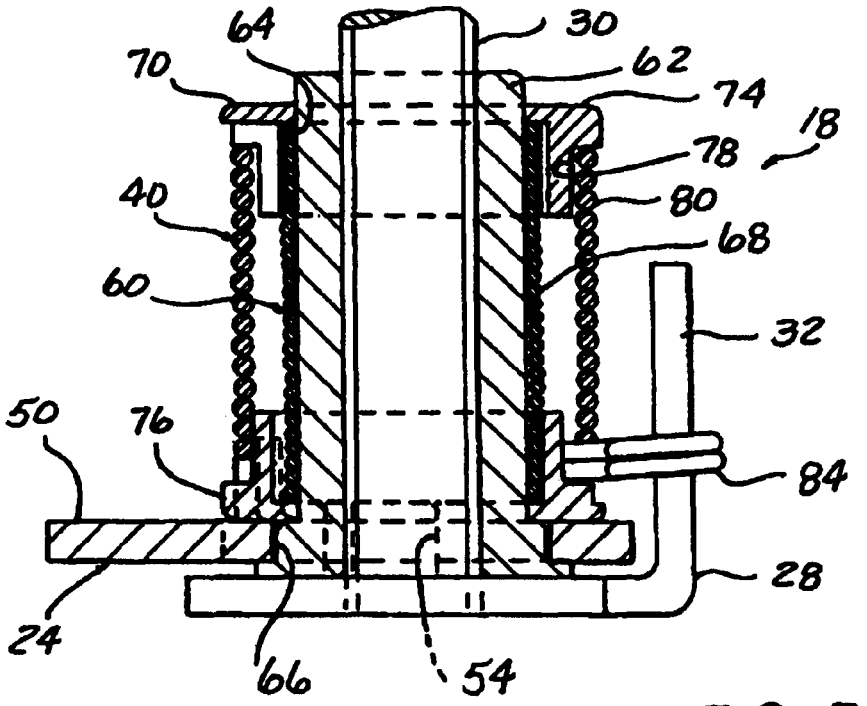
FIG. 3 is a detailed cross-sectional view of the fail-safe throttle positioning device as illustrated in FIG. 1 with certain portions removed and other portions shown in cross-section.
Figure 4:
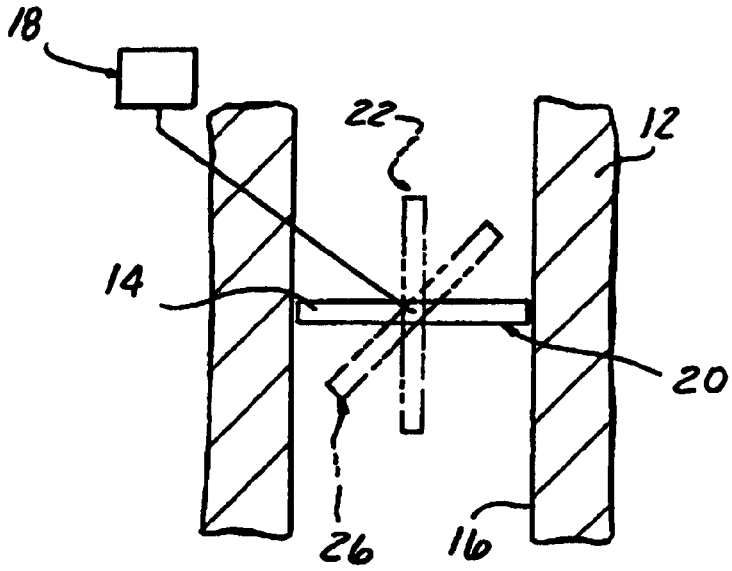
FIG. 4 is a schematic view of a throttle valve within a fluid passage of a throttle body for movement between predefined positions according to the present invention.
Figure 5:
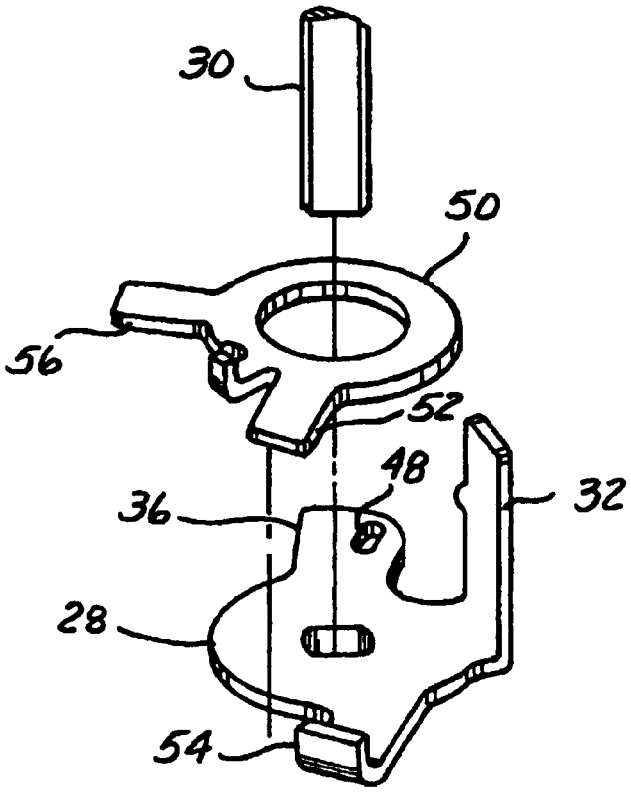
FIG. 5 is a simplified exploded perspective view of a shaft, a throttle valve lever and a fail-safe lever according to the present invention.

The fail-safe means 24, in the preferred embodiment as illustrated in FIG. 3, may also include a spacer sleeve 62 mounted on the shaft 30 external of the throttle body 12. The external portion of the shaft 30 may include a non-circular section as best seen in FIG. 2 for engagement with the throttle lever 28. The spacer sleeve 62 may include a reduced diameter, longitudinally elongated surface 64 and adjacent one end an enlarged diameter annular shoulder 66. The fail-safe lever 50 is engageable rotatably on the enlarged diameter, annular shoulder 66 of the spacer sleeve 62, allowing the fail-safe lever 50 to rotate independently of the shaft 30. The fail-safe spring means 60 may include a helical spring 68 extending longitudinally over the reduced diameter, longitudinally elongated surface 64 of the spacer sleeve 62. A first end 70 of the helical spring 68 is connected to the throttle body 12 and a second end 72 of the helical spring 68 is connected to the fail-safe lever 50 for normally urging the fail-safe lever 50 toward engagement of the second surface 56 of the fail-safe lever 50 with the fail-safe stop 58 to thereby hold the throttle lever 28 in the intermediate fluid flow position 26. Spring bushings, 74 and 76, are disposed at the longitudinal ends of the helical fail-safe spring 68 and overlay longitudinally at least a portion of the fail-safe helical spring 68. The spring bushings, 74 and 76, include an external surface 78 extending longitudinally. The throttle spring means 40 can include a helical throttle spring 80 extending longitudinally over the spring bushings, 74 and 76. The helical throttle spring 80 has a first end 82 connected to the throttle body 12 and a second end 84 connected to the throttle lever 28 to normally urge the throttle lever 28 toward the minimum fluid flow position 20 where the first surface 32 on the throttle lever 28 engages the first stop 34. The throttle spring means 40 has less force than the fail-safe spring means 60, so that the fail-safe spring means 60 is able to drive the throttle lever 28 to the intermediate fluid flow position 26 through fail-safe lever 50 contacting the longitudinally extending throttle tab 54 of the throttle lever 28 with the first surface 52 of the fail-safe lever 50. The fail-safe lever 50 is urged by the fail-safe spring means 60 toward the intermediate fluid flow position 26 where the second surface 56 of the fail surface lever 50 engages the fail-safe stop 58.

The fail-safe throttle positioning system 10 according to the present invention for a mechanically operated throttle device with direct acting idle speed control device can include a throttle lever 28 for direct connection to the throttle shaft 30 and throttle valve 14, along with provisions for attachment to the vehicle throttle system. A fail-safe position lever 50 contacts a fixed stop 58 and the idle speed control lever 28 or throttle lever 28. The fail-safe lever 50 is held in place against the fixed fail-safe stop 58 by a fail-safe spring means 60. The idle speed control lever or throttle lever 28 provides an attachment point for an idle speed actuator means 18. A throttle return spring means 40 provides normal throttle system return force and is attached the throttle body 12 at one end and the throttle lever 28 at the other end. The throttle return spring means 40 has less force than the fail-safe spring means 60. The system allows the idle speed control actuator means 18 to position the throttle valve anywhere in the range from minimum idle air flow throttle valve set position, such as minimum fluid flow position 20 to some predetermined throttle valve position that allows more air flow than the fail-safe position, such as maximum fluid flow position 22. In the event that the idle speed control actuator means 18 loses force, the fail-safe throttle positioning system 10 is intended to provide a predetermined throttle valve position greater than the minimum idle air flow set position, such as intermediate fluid flow position 26. The fail-safe throttle positioning system 10 functions properly only if the vehicle throttle system is free to move over its entire operating range.

The fail-safe throttle operating system 10 for an electrically operated throttling device can include a throttle control lever 28 contacting the fail-safe position lever 50. The throttle control lever 28 provides an attachment point for the throttle control actuator means 18. The fail-safe position lever 50 contacts a fixed fail-safe stop 58 and the throttle control lever 28. The fail-safe lever 50 is held in place against the fixed fail-safe stop 58 by fail-safe spring means 60. Throttle spring means 40 provides normal throttle system return force and is attached to the throttle body 12 at one end and the throttle control lever 28 at the other end. The throttle return spring means 40 has less force than the fail-safe position spring means 60. The fail-safe throttle positioning system 10 according to the present invention allows the throttle control actuator means 18 to position the throttle valve 14 anywhere in the range from minimum idle air flow throttle valve set position, such as minimum fluid flow position 20, to a wide open throttle position, such as maximum fluid flow position 22. In the event that the throttle control actuator means 18 loses force, the fail-safe throttle positioning system 10 is intended to provide a predetermined throttle valve position greater than the minimum idle air flow set position, such as intermediate fluid flow position 26.

In operation, when the actuator means 18 is in a de-energized state, or failure mode, the throttle spring 80 urges the throttle lever 28 in a clockwise direction as illustrated in FIG. 2 toward engagement of the first surface 32 of the throttle lever 28 with the first stop 34. Before reaching the minimum fluid flow position 20 where the first surface 32 engages the first stop 34, the clockwise rotational urging of the throttle spring 80 is overcome by the counterclockwise urging of the fail-safe helical spring 68 to maintain the second surface 56 of the fail-safe lever 50 against the fail-safe stop 58 through contact of the first surface 52 of the fail-safe lever 50 with the longitudinally extending throttle tab 54 of the throttle lever 28. The de-energized state, or neutral position, of the actuator means 18 may be overcome by appropriate manipulation of the accelerator mechanism by the driver. If the actuator means 18 has not failed, manipulation of the accelerator mechanism by the driver will result in movement of the throttle lever 28 and connected throttle valve 14 from the intermediate fluid flow, fail-safe position 26 toward the minimum fluid flow position 20 if the engine is idling, or toward the maximum fluid flow position 22 if full engine power is desired. In the case of warm engine idle prior to actuator means failure, the throttle valve 14 would be moved into the minimum fluid flow position 20 with the first surface 32 of the throttle lever 28 engaging the first stop 34. This may be accomplished in a "drive-by wire" configuration by energizing the reversible electric motor 42 to rotate the radially extending drive arm 44 and connected drive pin 46 in a clockwise direction to engage within the elongated slot 48 of the throttle lever 28 to overcome the counterclockwise rotational urging of the helical fail-safe spring 68. The fail-safe lever 50 is rotated clockwise in conjunction with the throttle lever 28 through contact of the first surface 52 with the longitudinally extending throttle tab 54 of the throttle lever 28 when moving in a clockwise direction from the intermediate fluid flow position 26. In the case of increased engine power being required and prior to actuator means 18 failure, the throttle valve 28, as illustrated in FIG. 2, is driven by the actuator means 18 in a counterclockwise direction. If the throttle lever 28 is traveling in the counterclockwise direction from the minimum fluid flow position 20 described above, once the second surface 56 of the fail-safe lever 50 engages the fail-safe stop 58, further counterclockwise rotation of the fail-safe lever 50 is prevented. However, since the fail-safe lever 50 is supported independent of rotation of the shaft 30, further rotation of the shaft 30 and connected throttle valve 14 is permitted. In a "drive-by wire" configuration, the reversible electric motor 42 may be energized in a suitable manner to drive the radially extending drive arm 44 and connected drive pin 46 in the counterclockwise direction, as viewed in FIG. 2, and by engagement of the drive pin 46 within the elongated slot 48 of the throttle lever 28 drive the throttle lever 28 in the counterclockwise direction from the intermediate fluid flow position 26 toward the maximum fluid flow position 22. If full engine power is required, the electric motor 42 may be energized sufficiently to drive the throttle lever 28 so that the second surface 36 of the throttle lever 28 engages the second stop 38 holding the throttle valve 14 in the maximum fluid flow position 22. If less than full power is required, the electric motor 42 may be energized sufficiently to hold the throttle valve 14 in an angular position less than the maximum fluid flow position 22. When the throttle valve 14 is in the minimum fluid flow position 20, it typically is at an angle of approximately 7° with respect to the plane of the throttle valve 14 being perpendicular to the longitudinal axis of the fluid passage 16. During a normal warm engine idle at approximately 500 revolutions per minute, the throttle valve 14 would be at a position between 7° and 9° from perpendicular to the longitudinal axis of the fluid passage 16. The maximum fluid flow position 22 would correspond to the plane of the throttle valve being contiguous with the longitudinal axis of the fluid passage 16. The intermediate fluid flow position 26 would correspond to the throttle valve 14 being at approximately 17° from perpendicular with respect to the longitudinal axis of the fluid passage 16. It is believed that this angular position of the throttle valve 14 is sufficient to allow the engine to develop enough power to move the vehicle in order to transport the vehicle to a suitable repair center to fix the failed actuator means 18.

In the event of actuator means 18 failure while the engine is idling and the throttle lever 28 is disposed having the first surface 32 engaging the first stop 34, the fail-safe spring means 60 overcomes the throttle spring means 40 to move the throttle lever 28 through contact with the first surface 52 of the fail-safe lever 50 and the longitudinally extending throttle tab 54. The fail-safe spring means 60 urging the throttle lever 28 to the intermediate fluid flow position 26. When the throttle lever 28 reaches the intermediate fluid flow position 26, the second surface 56 of the fail-safe lever 50 reaches the fail-safe stop 58 preventing further counterclockwise rotation, as illustrated in FIG. 2, of the throttle lever 28 passed the fluid flow position 26. In the case of actuator means 18 failure while the throttle lever 28 is in the maximum fluid flow position 22, the throttle spring means 40 will urge the throttle lever 28 in the clockwise direction, as illustrated in FIG. 2, until it reaches the intermediate fluid flow position 26. At the intermediate fluid flow position 26, the throttle spring means 40 lacks sufficient force to overcome the counterclockwise urging of the fail-safe spring means 60 against the fail-safe lever 50 where the first surface 52 of the fail-safe /lever 50 prevents further clockwise rotation of the throttle lever 28 by engagement with longitudinally extending throttle tab 54.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

[1. A fail safe throttle positioning device for an engine induction system comprising:

a throttle body having a fluid passage passing therethrough;

a movable throttle valve for controlling at least idle speed, said throttle valve mounted for movement with respect to said throttle body and disposed in said fluid passage for controlling fluid flow in response to movement of said throttle valve;

actuator means connected to said throttle valve for operably moving said throttle valve between a minimum fluid flow position and a maximum fluid flow position; and fail safe means for urging said throttle valve toward an intermediate position between said minimum and maximum fluid flow positions to prevent inoperability of said engine during actuator means failure.]

[2. The device of claim 1 wherein said actuator means further comprises:

a rotatable shaft supporting said throttle valve within said fluid passage for rotational movement;

a throttle lever connected to said shaft for rotation therewith, said throttle lever having a first surface engageable with a first stop defining a minimum fluid flow position and a second surface engageable with a second stop defining a maximum fluid flow position; and throttle spring means for normally urging said throttle lever toward said minimum fluid flow position.]

[3. The device of claim 2 wherein said fail safe means further comprises:

a fail safe lever mounted on said shaft for rotation independent of said shaft, said fail safe lever having a first surface engageable with said throttle lever and a second surface engageable with a fail safe stop; and fail safe spring means for urging said fail safe lever toward said fail safe stop such that said throttle lever is held in said intermediate position until driven by said actuator means toward one of said minimum and maximum fluid flow positions.]

[4. The device of claim 3 further comprising:

a spacer sleeve mounted on said shaft external of said throttle body;

said fail safe spring means including a helical spring extending longitudinally over said spacer sleeve and having a first end connected to said throttle body and a second end connected to said fail safe lever;

spring bushings disposed at longitudinal ends of said fail safe spring and overlaying longitudinally at least a portion of said fail safe spring; and said throttle spring means including a helical spring extending longitudinally over said spring bushings and having a first end connected to said throttle body and a second end connected to said throttle lever.]

[5. The device of claim 1 wherein said actuator means further comprises:

mechanically operated actuator means connected to said throttle lever and responsive to driver input.]

[6. The device of claim 1 wherein said actuator means further comprises:

electrically operated actuator means connected to said throttle lever and responsive to driver input.]

7. A fail safe throttle positioning device for an engine induction system comprising:

a throttle body having an elongated fluid passage extending therethrough with a longitudinal axis;

an elongated shaft having a rotational axis generally perpendicular to said longitudinal axis of said fluid passage;

a throttle valve mounted on said shaft for rotational movement therewith and disposed within said fluid passage for controlling an amount of fluid flow through said fluid passage in response to rotational movement of said shaft;

a throttle lever connected to said shaft for rotation therewith, said throttle lever having a first surface engageable with a first stop defining a minimum fluid flow position and a second surface engageable with a second stop defining a maximum fluid flow position;

throttle spring means for normally urging said throttle lever toward said minimum fluid flow position;

actuator means connected to said throttle lever for operably moving said throttle lever against said urging of said throttle spring means toward said maximum fluid flow position; and fail safe means for urging said throttle lever toward an intermediate position between said minimum and maximum fluid flow positions to prevent inoperability of said engine during failure of said actuator means.

8. The device of claim 7 wherein said fail safe means further comprises:

a fail safe lever rotatably mounted on said shaft, said fail safe lever having a first surface engageable with said throttle lever and a second surface engageable with a fail safe stop; and fail safe spring means for urging said fail safe lever toward said fail safe stop such that said throttle lever is held in said intermediate position until driven by said actuator means toward one of said minimum and maximum fluid flow positions.

9. The device of claim 8 further comprising:

a spacer sleeve mounted on said shaft external of said throttle body;

said fail safe spring means including a helical spring extending longitudinally over said spacer sleeve and having a first end connected to said throttle body and a second end connected to said fail safe lever;

spring bushings disposed at longitudinal ends of said fail safe spring and overlaying longitudinally at least a portion of said fail safe spring; and said throttle spring means including a helical spring extending longitudinally over said spring bushings and having a first end connected to said throttle body and a second end connected to said throttle lever.

10. The device of claim 7 wherein said actuator means further comprises:

mechanically operated actuator means connected to said throttle lever and responsive to driver input.

11. The device of claim 7 wherein said actuator means further comprises:

electrically operated actuator means connected to said throttle lever and responsive to driver input.

12. A fail safe throttle positioning device for an engine induction system comprising:

a throttle body defining a fluid passage;

throttle valve means for controlling at least idle speed, said throttle valve means mounted for movement within said fluid passage to control fluid flow through said fluid passage by movement of said throttle valve means;

actuator means, connected to said throttle valve means, for moving said throttle valve means between a minimum fluid flow position and a maximum fluid flow position in response to input signals;

fail safe means for urging said throttle valve means toward an intermediate position between said minimum and maximum fluid flow positions to prevent inoperability of said engine during failure of said actuator means, said fail safe means including coaxial, counteracting, first and second helical spring means, said first helical spring means for urging said throttle valve means toward said minimum fluid flow position and said second helical spring means for urging said throttle valve means toward an intermediate position between said minimum and maximum fluid flow positions, said second helical spring means applying greater force to said throttle valve means than said first helical spring means.

13. The device of claim 12 wherein said fail safe means further comprises:

a fail safe lever connected to said throttle valve means, said fail safe lever having a first surface engageable with said throttle valve means and a second surface engageable with a fail safe stop; and said second helical spring means for urging said fail safe lever toward said fail safe stop such that said throttle valve means is held in said intermediate position until driven by said actuator means toward one of said minimum and maximum fluid flow positions.

14. The device of claim 12 further comprising:

said throttle valve means including a rotatable shaft;

a spacer sleeve mounted on said shaft external of said throttle body;

said second helical spring means including a fail safe helical spring extending longitudinally over said spacer sleeve and having a first end connected to said throttle body and a second end connected to said fail safe means;

spring bushings disposed at longitudinal ends of said fail safe helical spring and overlaying longitudinally at least a portion of said fail safe helical spring; and said throttle valve means including a throttle return helical spring extending longitudinally over said spring bushings and having a first end connected to said throttle body and a second end connected to said throttle valve means.

15. The device of claim 12 wherein said actuator means further comprises:

mechanically operated actuator means connected to said throttle lever and responsive to driver input.

16. The device of claim 12 wherein said actuator means further comprises:

electrically operated actuator means connected to said throttle lever and responsive to driver input.

*17. A fail safe throttle positioning device for an engine induction system comprising:*

*a throttle body having a fluid passage extending through said throttle body;*

*a shaft extending across said fluid passage;*

*a throttle valve mounted on said shaft for rotation and movement therewith and disposed within said fluid passage for controlling an amount of fluid flow through said fluid passage in response to rotational movement of said shaft;*

*a throttle lever connected to said shaft for rotation therewith, said throttle lever having a first surface engagable with a first stop defining a minimum fluid flow position and a second surface engagable with a second stop for defining a maximum fluid flow position;*

*a throttle spring for urging said throttle lever toward said minimum fluid flow position;*

*an actuator connected to said throttle lever for operably moving said throttle lever against said urging of said throttle spring toward said maximum fluid flow position; and*

*a fail safe spring for urging said throttle lever toward an intermediate position between said minimum and maximum fluid flow positions to prevent inoperability of said engine during failure of said actuator.*

*18. The device of claim 17 wherein said actuator further comprises an electrically operated actuator connected to said throttle lever.*

*19. The device of claim 17 wherein said actuator further comprises a mechanically operated actuator connected to said throttle lever.*

*20. The device of claim 17 wherein said fail safe spring and said throttle spring are nested substantially within each other.*

*21. The device of claim 17 wherein said fail safe spring and said throttle spring are nested at least partially within each other.*

*22. The device of claim 17 wherein said fail safe spring and said throttle spring are axially juxtaposed to each other.*

*23. The device of claim 17 further comprising a fail safe lever rotatably mounted on said shaft to rotate independently of said shaft, wherein said fail safe lever is positioned between said fail safe spring and said throttle lever so that said fail safe lever urges said throttle lever toward said intermediate position.*

*24. The device of claim 17 further comprising:*

*a fail safe lever rotatably mounted on said shaft, said fail safe lever having a first surface engageable with said throttle lever and a second surface engageable with a fail safe stop; and*

*wherein said fail safe spring is operably engaged to said fail safe lever and urges said fail safe lever toward said throttle lever such that said throttle lever is held in said intermediate position until driven by said actuator toward one of said minimum and maximum fluid flow positions.*

*25. The device of claim 24 wherein said throttle lever and said fail safe lever are axially juxtaposed.*

*26. A fail safe throttle positioning device for an engine induction system comprising:*

*a throttle body defining a fluid passage;*

*a throttle valve mounted for movement within said fluid passage to control fluid flow through said fluid passage by movement of said throttle valve;*

*an actuator connected to said throttle valve for moving said throttle valve between a minimum fluid flow position and a maximum fluid flow position in response to input signals;*

*a fail safe arrangement for urging said throttle valve toward an intermediate position between said minimum*

*and maximum fluid flow positions to prevent inoperability of said engine during failure of said actuator, said fail safe arrangement including coaxial, first and second helical springs, said first helical spring for urging said throttle valve toward said minimum fluid flow position and said second helical spring for urging said throttle valve toward an intermediate position between said minimum and maximum fluid flow positions, said second helical spring applying greater force to said throttle valve than said first helical spring.*

*27. The device of claim 26 wherein said actuator further comprises an electrically operated actuator operably connected to said throttle lever.*

*28. The device of claim 26 wherein said actuator further comprises a mechanically operated actuator connected to said throttle lever.*

*29. The device of claim 26 wherein said fail safe arrangement further comprises a fail safe lever mounted on said shaft to rotate independently of said shaft, wherein said fail safe lever is positioned between said second spring and said throttle lever so that said fail safe lever urges said throttle lever toward said intermediate position.*

*30. The device of claim 26 further comprising:*

*a fail safe lever rotatably mounted on said shaft, said fail safe lever having a first surface engageable with a throttle lever operably connected to said throttle valve and said actuator and a second surface engageable with a fail safe stop; and*

*wherein said second spring is operably engaged to said fail safe lever and urges said fail safe lever toward said fail safe stop such that said throttle lever is held in said intermediate position until driven by said actuator toward one of said minimum and maximum fluid flow positions.*

*31. The device of claim 30 wherein said throttle lever and said fail safe lever are axially juxtaposed.*

* * * * *